Aug. 25, 1959          K. GEBELE          2,900,886
PHOTOGRAPHIC CAMERA AND SHUTTER CONSTRUCTION
Filed July 8, 1955          3 Sheets-Sheet 2

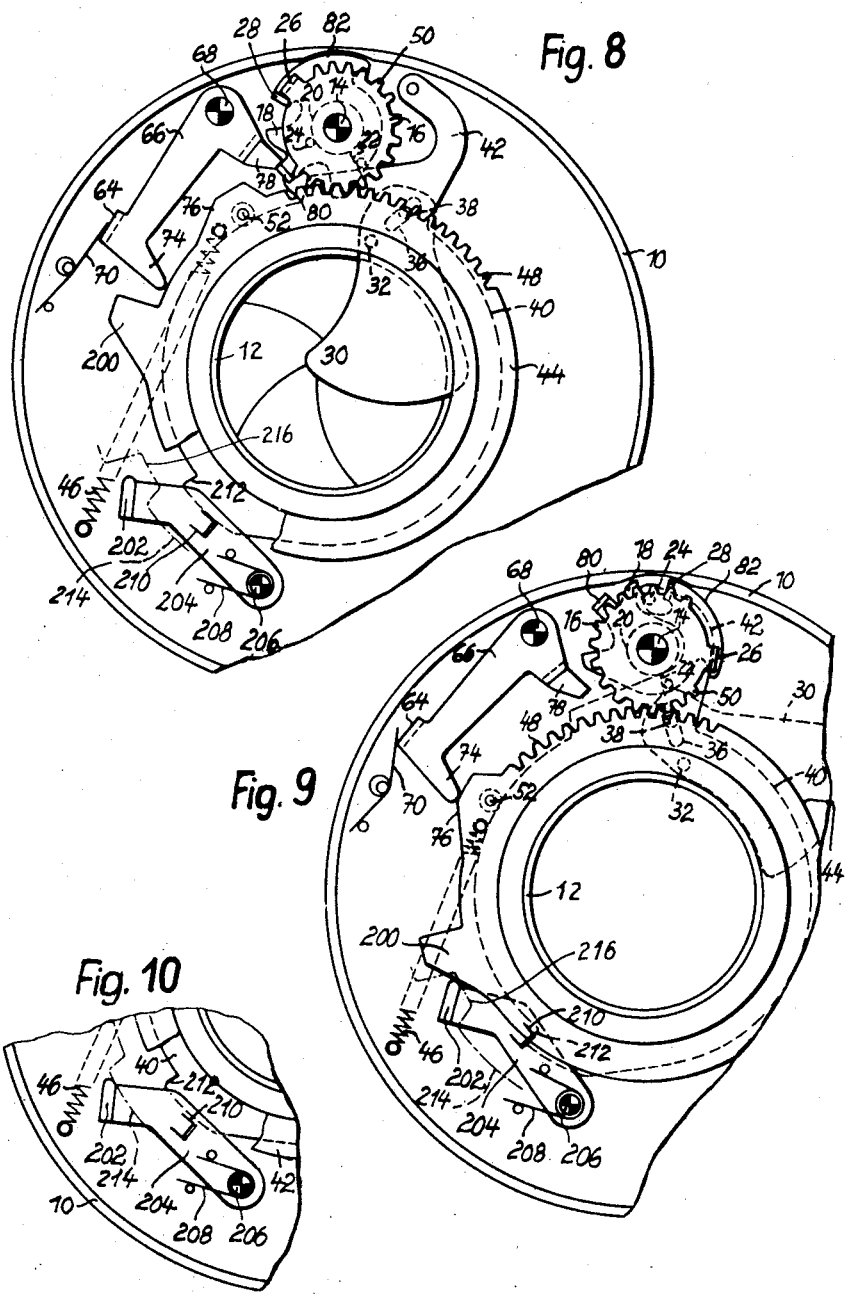

United States Patent Office

2,900,886
Patented Aug. 25, 1959

---

2,900,886

PHOTOGRAPHIC CAMERA AND SHUTTER CONSTRUCTION

Kurt Gebele, Munich, Germany, assignor to Hans Deckel, Munich-Solln, Germany, and Friedrich Wilhelm Deckel, Zug, Switzerland Application July 8, 1955, Serial No. 520,875

Claims priority, application Germany July 9, 1954

13 Claims. (Cl. 95—31)

---

This invention relates to a photographic camera and shutter construction, in which the shutter is of the set or tensioned type (that is, a shutter requiring a separate tensioning or cocking operation prior to the release of the shutter to make an exposure) and in which both the tensioning or cocking of the shutter, and the release thereof, are accomplished by manual movement of parts mounted on the camera body rather than mounted directly upon the shutter casing.

An object of the invention is the provision of a generally improved and more satisfactory structure of this kind.

Another object is the provision of a construction of the kind above mentioned, in which both the tensioning and release of the shutter are accomplished through only a single movable member extending from the camera body or housing into the shutter casing or housing.

Still another object is the provision of a construction in which the single operating member from the camera body to the shutter, serving both to cock or tension the shutter and to release it, is applicable also to the making of lengthened or "bulb" exposures as well as ordinary instantaneous exposures.

These and other desirable objects may be attained in the manner disclosed as an illustrative embodiment of the invention in the following description and in the accompanying drawings forming a part hereof, in which:

Fig. 8 is a view similar to Fig. 2 showing a modified form of shutter which may be used in taking bulb exposures as well as instantaneous exposures, with the parts in tensioned or cocked condition and with the shutter set to make a bulb exposure;

Fig. 9 is a view similar to Fig. 8, showing the parts in a position holding the shutter blades open for making a bulb exposure; and Fig. 10 is a view similar to a fragment of Figs. 8 and 9, showing the bulb lever in an ineffective position so that the shutter may make an instantaneous exposure.

The same reference numerals throughout the several views indicate the same parts.

Figure 1:
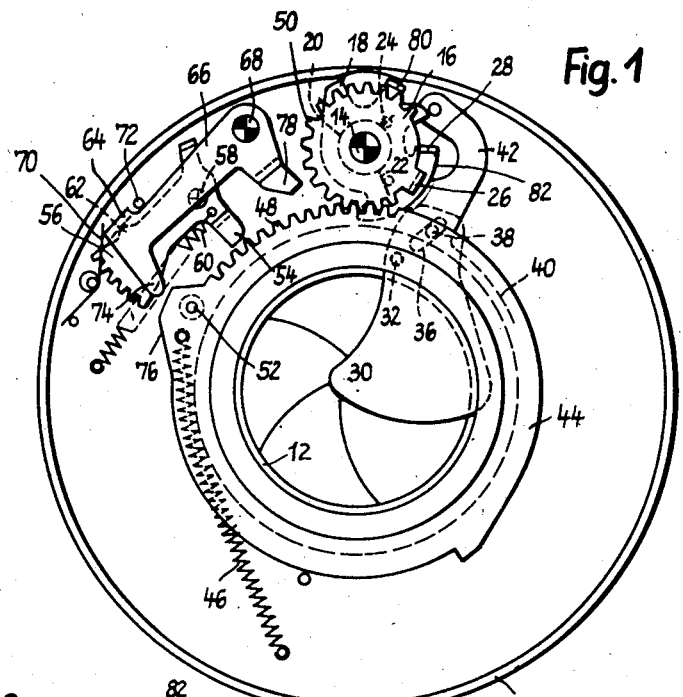
Fig. 1 is a front face view of a shutter according to one embodiment of the present invention, with the cover plate removed to show the parts beneath, and with part of the interior mechanism also removed, the shutter parts being shown in rest or run-down position.
Figures 2, 3:
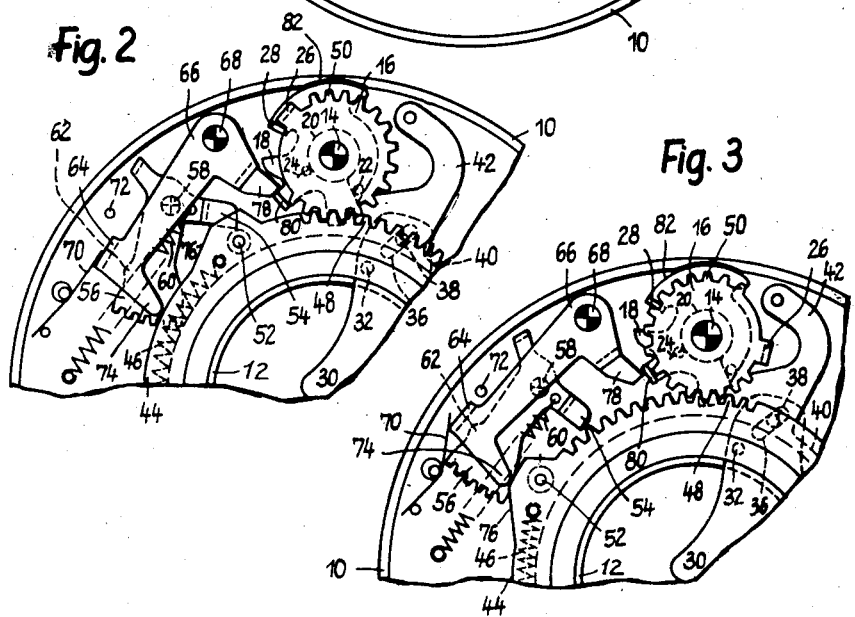
Fig. 2 is a view similar to a fragment of Fig. 1, showing the parts in tensioned or cocked position.
Fig. 3 is a view similar to Fig. 2 showing the parts released and partially run down.
Figure 7:
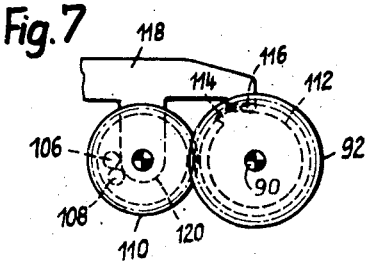
Fig. 7 is a view similar to Fig. 6 showing the parts in still another position.

Reference is made first to Figs. 1 to 3 of the drawings, illustrating the shutter which forms part of the present invention. The details of many of the parts of the shutter are not important for present purposes, so are not described or illustrated. Except for the differences herein mentioned, the shutter may be essentially the same as the shutter disclosed in Figs. 7–9 of the drawings of applicant's copending patent application filed June 9, 1955, Serial No. 514,218, and also similar in a general way and in many of its parts to the shutter disclosed in applicant's copending application filed May 20, 1955, Serial No. 509,929, except that the latches 92 and 94 shown in the drawings of said last mentioned copending application are omitted in the present shutter.

The shutter includes the usual annular housing or casing 10 having a central exposure opening defined by the lens tube 12 and normally closed by the shutter blades 30. A shaft 14 is mounted in the shutter casing with its axis parallel to the optical axis of the shutter, and extends out the back of the shutter and into the associated camera with which the shutter is used. A disk 16 is firmly fixed to the front end of the shaft 14 to turn therewith. Behind the disk 16 and rotatable on the shaft 14 is the main driving member or master member 18 of the shutter, powered by a main drive spring 20 wound around the shaft 14 and having one end 22 held fast in the shutter casing by a suitable pin, the other end 24 being connected to the master member 18. A rearwardly extending ear or lug 26 on the disk 16 is arranged to engage a forwardly extending ear or lug 28 on the master member 18, when the shaft 14 and disk 16 are turned in a counterclockwise direction, so as to cause corresponding counterclockwise movement of the master member 18 in a tensioning or cocking direction, until a lug 80 on the master member becomes engaged behind a latching nose 78 on a latching pawl 66, as described below.

The shutter blades 30, of any desired number, are pivoted on pivot pins 32 to swing thereon between open and closed positions. Each blade also contains a control slot 36 engaged by a control pin 38 on a blade ring 40 which rotates about the optical axis of the shutter as a center, and which has an arm 42 extending in a somewhat radial direction and provided with drive pins which cooperate with the master member 18 in such manner that during the running-down or exposure-making movement of the master member, the master member will move the arm 42 and blade ring 40 first in a counterclockwise direction to open the blades 30 and then in a clockwise direction to close the blades again.

A control ring 44 is also rotatably mounted in the shutter casing for rotation about the optical axis as a center, and is operatively connected to one end of a coil tension spring 46 which tends to turn the ring 44 in a counterclockwise direction. Gear teeth 48 on a portion of the periphery of the control ring 44 are constantly in mesh with gear teeth 50 on a portion of the periphery of the disk 16. Due to the meshing gear teeth on these two members, counterclockwise rotation of the disk 16, when the shutter is being tensioned or cocked, will cause clockwise rotation of the control ring 44, to bring a pin 52 thereon into engagement with a tail 54 on a toothed segment 56 pivoted in the shutter casing at 58 and urged in a clockwise direction on its pivot by a spring 60. The gear teeth on this segment 56 mesh with an escapement mechanism of known type, not important for present purposes and not here shown, so that the running down motion of the segment 56 (when the tail 54 thereof is released from the pin 52) is delayed.

In certain positions of the parts, a portion 62 of the member 56 presses against a downwardly extending lug 64 on the latching pawl or lever 66 which is rotatably supported on a pivot 68 in the shutter housing. A spring 70 presses against the lug 64, tending to swing the latching pawl 66 in a counterclockwise direction on its pivot 68 and tending to hold the ear 64 in engagement with the part 62 of the segment 56. The spring 60 of the segment 56 is stronger than the spring 70 of the pawl 66, so that, under certain conditions (the details of which are not important for present purposes) the force of the spring 60, turning the segment 56, will cause the nose 62 to press the latching pawl 66 in a clockwise direction to its final or ultimate position determined by a stop pin 72.

The latching pawl 66 also has a nose 74 extending in a general direction toward the center or optical axis of the shutter, and adapted to cooperate with an inclined cam 76 on the control ring 44, to swing the nose 74 and lever 66 outwardly or in a clockwise direction on its pivot, when the control ring 44 moves from the position shown in Fig. 2 to the position shown in Fig. 3. The latching pawl also has another nose or latch portion 78 adapted to cooperate with a lug 80 on the master member 18, to latch the master member in its wound up or cocked or tensioned position shown in Fig. 2, as already briefly indicated above.

It may be mentioned here that the master member 18 also has a cam portion 82 which cooperates with a clockwork escapement mechanism (not shown) provided in the shutter casing 10, in order to control the speed of the running-down motion of the master member in a known manner, the details not being important for present purposes. By means of the usual shutter speed adjusting ring or disk (not shown) mounted at the front of the shutter, the delaying action of the escapement mechanism on the master member can be varied at will, thus producing different shutter speeds.

In tensioning or cocking the shutter, the shaft 14 is turned in a counterclockwise direction when viewed from the front as in Fig. 1, so that the ear 26 on the disk 16 makes contact with the ear 28 on the master member 18, and carries the master member around with the disk 16, in a counterclockwise direction, from the released or run-down position shown in Fig. 1 to the tensioned or cocked position shown in Fig. 2. Simultaneously, the counterclockwise rotation of the disk 16, acting through the gear teeth 50, 48, causes clockwise rotation of the control ring 44, so that the pin 52 thereon swings the tail 54 of the segment 56 to remove the portion 62 of this segment from the ear 64 of the latching pawl 66, thereby allowing the tail 78 of the latching pawl to snap behind the ear 80 of the master member (under the influence of the spring 70) when the master member reaches its fully tensioned position shown in Fig. 2.

As long as the shaft 14 and disk 16 are held against return motion in a clockwise direction, the master member will remain latched by the latching pawl 66. When the shaft 14 is released and is free to turn in a clockwise direction, the spring 46 will be able to move the control ring 44 in a counterclockwise direction from the position shown in Fig. 2 to the position shown in Fig. 3, so that the cam 76 on the control ring will release the latching pawl 66 from the master member, and will allow the master member to start its running down motion to move the blade ring 40 to open and close the shutter blades.

Thus it is seen that the shutter, in this form of construction, may have its operation controlled in a very simple manner by the single shaft 14 extending rearwardly from the shutter into the associated camera, the shaft 14 being turned counterclockwise to tension or cock the shutter, the shutter remaining tensioned or cocked as long as the shaft 14 is held against return movement in a clockwise direction, and the shutter being released or triggered for an exposure whenever the shaft 14 is released so that it may turn in a clockwise direction. The shutter is thus adapted to easy and simple operation by relatively simple parts mounted on the camera body, which can be designed and constructed in a manner to control only the single shaft 14, without requiring additional or multiple operating connections between the camera body and the shutter.

The parts on the camera body for controlling the shaft 14 will now be described in a preferred form, with special reference to Figs. 4–7. The rear end of the shaft 14, projecting into the camera body indicated diagrammatically at 88, is provided with a bevel gear 84 meshing with another bevel gear 86 on a vertical shaft 90 rotatable within the camera body. A gear 92 is fixed to the shaft 90 and is operatively connected to the film winding mechanism to be turned thereby, as explained below, so that the tensioning or cocking of the shutter takes place simultaneously with the feeding or transport of the film.

An externally accessible film winding or feeding knob 94 on the camera body 88 is fixed to a rotatable shaft 95 which is secured to a gear 96 meshing with a gear 98 fixed to the film feeding roller 100. The gear 98 also meshes with an intermediate gear 101 which in turn meshes with and drives a gear 104 fixed to the release shaft 102, the upper end of which extends through the camera wall to an accessible external position and is movable axially with respect to the camera wall. The gear 104 carries a driving pin 106 adapted to contact with and drive a pin 108 on a gear 110 which is rotatably supported on the release shaft 102 and which meshes with and drives the previously mentioned gear 92 on the shaft 90. The hub of the gear 110 contains a circumferential groove 109 engaged by a fixed bracket 111 mounted on the camera body, thereby to prevent the gear 110 from moving in an axial direction when the shaft 102 is displaced axially.

Figure 4:
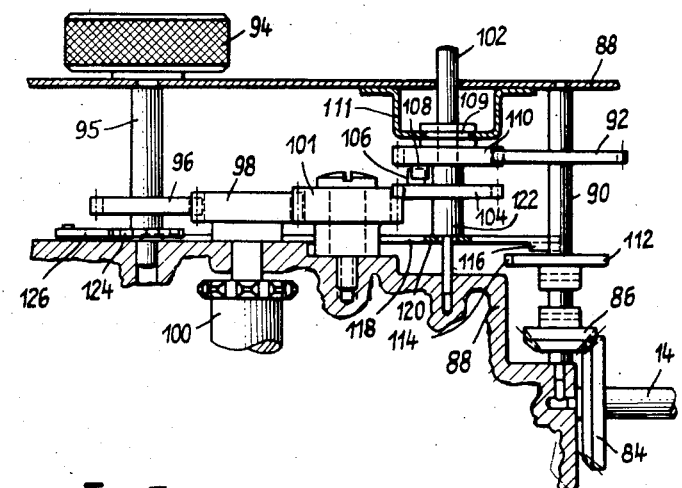
Fig. 4 is a schematic view of a portion of the camera body, partly in vertical section and partly in elevation, illustrating somewhat diagrammatically the camera body parts which serve to tension and to release the shutter.
Figure 5:
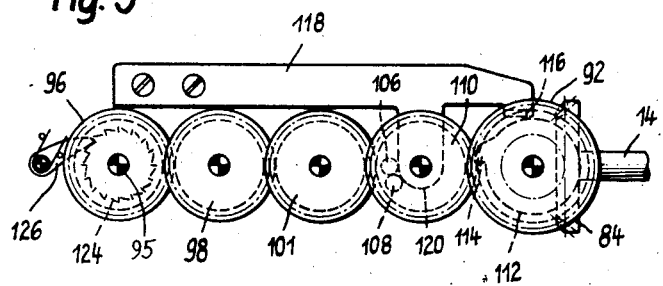
Fig. 5 is a plan of certain of the parts shown in Fig. 4.

The shaft 90 also is fixed to a disk 112 having a latching nose or tooth 114 adapted to engage with and to be obstructed by a locking tooth 116 on one end of a leaf spring 118, the other end of which is suitably fixed to a stationary part of the camera body, which leaf spring has a lateral extension 120 which surrounds the shaft 102 just below a shoulder 122 thereon. In its normal or relaxed position, the spring 118 lies in a plane above the disk 112 as seen in Fig. 4, so that the tooth 116 is not in the path of the latching tooth 114 of the disk 112. However, if the shaft 102 is depressed or displaced axially downwardly, the shoulder 122 pressing on the leaf spring 118 will flex the free end of the spring downwardly so as to carry the tooth 116 down into the plane of the disk 112 where it will lie in the path of travel of the tooth 114 as the disk rotates.

The shaft 95 of the winding knob 94 carries a disk 124 having ratchet teeth around its periphery, for cooperation with a spring pressed pawl 126 which allows the knob 94 and shaft 95 to be turned in a clockwise direction (when viewed from above) but prevents counterclockwise or reverse rotation of the parts.

With this arrangement, rotation of the film winding knob 94 in a clockwise direction serves to wind the film in the camera, by means of the film feeding roller 100. At the same time, the driving pin 106, acting on the pin 108, causes a turning of the gear 92 and shaft 90 in a clockwise direction when viewed from above, thereby causing counterclockwise rotation of the shaft 14 when viewed from the front as in Figs. 1–3. This tensions or cocks the shutter in the manner already described above, the master member of the shutter being held in tensioned or wound position by the tail 78 of the latching pawl 66, and the shaft 14 (together with the disk 16 and the control ring 44) being held in tensioned or wound position by the pawl 126 acting on the ratchet 124 which prevents reverse movement of the parts. The shutter will stay in its tensioned or wound condition as long as desired.

When the operator is ready to make the exposure, he presses downwardly on the accessible or protruding upper end of the shaft 102, which thus constitutes the release plunger or shutter trigger of the camera. This downward axial movement of the shaft 102 carries the gear 104 downwardly with it, until the driving pin 106 moves downwardly past the pin 108. The downward movement of the shaft also serves to flex the spring 118 so as to carry the locking tooth 116 down into the plane of the disk 112, in position to obstruct the tooth 114. However, at this time the tooth 114 is in the position shown in Fig. 7 and still has a considerable distance to travel before it will come into contact with the tooth 116, so that the tooth 116 does not immediately prevent rotation of the shafts 90 and 14.

The disengagement of the pins 106 and 108 from each other, caused by the depression of the plunger 102, serves to free the parts 110, 92, 90, and 14 from the restraining influence of the pawl and ratchet 124, 126, so that the shaft 14 is now free to turn back in a clockwise direction under the influence of the spring 46 tending to turn the control ring 44 in a counterclockwise direction. As the counterclockwise turning of the control ring continues, the cam 76 engages the nose 74 of the latching pawl 66 and swings the latching pawl so as to disengage the nose 78 thereof from the latching lug 80 of the master member, approximately in the position shown in Fig. 3. The main motor spring 20 of the master member may then turn the master member in a clockwise or running-down direction, to move the blade ring 40 so as to open and close the shutter blades 30.

Figure 6:
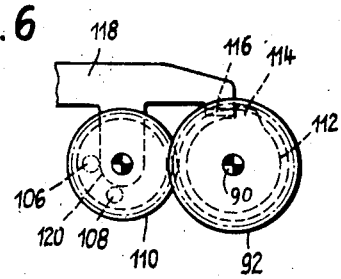
Fig. 6 is a view of the parts shown at the right hand end of Fig. 5, in a different position.

Just before the control ring 44 and shaft 14 reach their completely run-down or rest positions, the tooth 114 reaches the tooth 116 and stops the further rotation of the disk 112 and shafts 90 and 14, leaving the parts in the position shown in Fig. 6. However, this stopping of the return movement of the shaft 14 and disk 16 just before complete return to rest position, does not interfere with completion of movement of the master member 18 in closing the shutter blades, because there is a certain amount of lost motion between the ear 28 of the master member and the ear 26 of the disk 16 in the rest position of the parts, as seen in Fig. 1. Thus the master member may complete its travel to its rest position, even though the disk 16, shaft 14, and connected parts are temporarily stopped a little short of their rest position, by engagement of the tooth 114 with the tooth 116. When the operator releases his downward finger pressure on the plunger 102, the resilience of the spring 118 moves the plunger upwardly again to its initial position, and at the same time carries the tooth 116 upwardly out of the path of the tooth 114, thereby permitting the disk 112 to make a slight additional movement from the position shown in Fig. 6 to the position shown in Fig. 7, thus completing the return of the parts all the way to normal rest or relaxed or run-down position.

In the construction described, it will be seen that the control of the shutter from the parts of the camera body is extremely simple, and is all accomplished through a single shaft 14 which passes from the shutter casing into the camera body or housing. This same easy control mechanism can also be applied equally well to a shutter which is adapted to make extended or "bulb" exposures as well as ordinary instantaneous exposures, such a shutter being shown for example in Figs. 8–10. This shutter is essentially the same as the shutter previously described in connection with Figs. 1–3, except for the addition of a bulb exposure controlling lever and associated parts.

In the modified form of shutter, the control ring 44 is provided with an additional cam 200 for cooperating with an upwardly extending lug 202 on the bulb lever 204 pivoted in the shutter casing at 206 and acted upon by a spring 208 which tends to swing the bulb lever in a clockwise direction on its pivot. A punched out lug 210 on the bulb lever is bent downwardly to lie in the plane of the blade ring 40, in position to engage a shoulder 212 on the blade ring when the bulb lever is swung clockwise to the position shown in Fig. 9 and when the blade ring is turned counterclockwise to a position corresponding to full opening of the blades. The nose 202 on the bulb lever extends upwardly sufficiently far to lie in the plane of and be controlled by a cam surface 214 formed on the usual cam disk or shutter speed setting disk rotatably mounted on the front of the shutter. When the shutter setting disk is rotated to any of the positions corresponding to different lengths of instantaneous exposures, the cam 214 serves to hold the nose 202 of the bulb lever in the position shown in Fig. 10, maintaining the bulb lever in a counterclockwise position so that the lug 210 is displaced laterally out of the path of the shoulder 212 of the blade ring. The shutter, when operated, then makes an instantaneous exposure in the manner above described in connection with Figs. 1–3.

When the setting disk or cam disk at the front of the shutter is rotated to bulb or "B" position, a notch 216 on the cam surface 214 is brought opposite the nose 202 of the bulb lever, so that the spring 208 is free to swing the bulb lever in a clockwise direction on its pivot 206 until the lug 210 lies against the periphery of the blade ring, in approximately the position shown in Fig. 8. Then when the exposure is made, the opening motion of the blade ring in a counterclockwise direction brings the shoulder 212 just beyond the lug 210 when the blades become fully opened, thereby allowing the spring 208 to swing the bulb lever 204 further in a clockwise direction to the position shown in Fig. 9. The bulb lever then serves as a latch to prevent clockwise turning of the blade ring 40, thereby holding the blades fully open notwithstanding the force of the main spring 20 and the attempt of the master member 18 to close the blades. The master member, in other words, is blocked or stopped in a position in which the blades are fully open. The control ring 44, in turn, is stopped just short of its home or rest position, by engagement of the tooth 114 with the tooth 116 as above explained, so long as downward pressure on the release plunger 102 is maintained.

When the operator releases the downward pressure on the plunger 102, the control ring 44 may complete the last or final part of its return movement, as already explained above in connection with instantaneous exposures. During this final part of the return movement, the cam 200 on the control ring engages the nose 202 on the bulb lever 204 and displaces the bulb lever in a counterclockwise direction, to release the lug 210 from the shoulder 212 of the blade ring, thus permitting the master member to complete the closing movement of the blade ring.

The parts on the camera side are exactly the same, regardless of whether the shutter is adapted to make only instantaneous exposures, as in Figs. 1–3, or both instantaneous and bulb or extended exposures, as in Figs. 8–10. The latter or bulb form of shutter may therefore be regarded as the preferred form for purposes of the present invention, for it accomplishes everything that the first form accomplishes, and more besides.

When parts on the "camera side" are referred to, this expression is intended to mean those parts which lie on the camera side of the junction or dividing line between the shutter itself and the camera body; that is, those parts that are mounted in or on the camera body or casing, as distinguished from those parts contained within or mounted directly on the shutter casing or housing. The word "side" as used in the expressions "camera side" and "shutter side" is not intended to imply reference to a side wall as distinguished, e.g., from a top wall or other part of the structure, but is intended only to indicate that the part in question is on one or the other side of the dividing line or joint or junction between the shutter proper and the camera body on which the shutter is mounted.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a photographic camera body, of a shutter of the tensioning type mounted on said body, said shutter including a casing having an optical axis, a spring powered master member rotatable in one direction in said casing to tension the shutter preparatory to making an exposure and rotatable in the opposite direction under the influence of its tensioned spring power to make an exposure, a master member latch for latching said master member in tensioned position, a control member movably mounted within said casing for movement between a run-down position and a tensioned position, means on said control member for releasing said master member latch as said control member moves from tensioned position toward run-down position, an actuating member located at least partially within said shutter casing and effective upon movement in a first direction to tension both said master member and said control member, said actuating member being operatively coupled to said control member in such manner that said control member may not move toward run-down position without corresponding movement of said actuating member in a second direction, said actuating member including only a single member extending from said shutter casing into said camera body, and means mounted on said camera body and cooperating with said single member for moving said actuating member in said first direction to tension the shutter, for holding said actuating member stationary to maintain the shutter in tensioned position until an exposure is to be made, and for releasing said actuating member for movement in said second direction so that said control member may move toward run-down position to release said latch so that said master member may make an exposure.

2. A construction as defined in claim 1, in which said single member is in the form of a shaft arranged substantially parallel to the optical axis of the shutter and extending from the shutter casing into the camera body.

3. A construction as defined in claim 1, further including means mounted on said camera body for winding film, and in which said means for moving said actuating member in said first direction is driven by said film winding means.

4. A construction as defined in claim 1, further including a bulb exposure latch in said shutter casing for latching the shutter mechanism in a position with the shutter blades open, and means operated by said control member during the latter part of its return movement toward run-down position for releasing said bulb exposure latch.

5. A construction as defined in claim 1, further including a bulb exposure latch in said shutter casing for latching the shutter mechanism in a position with the shutter blades open, means operated by said control member during the latter part of its return movement toward run-down position for releasing said bulb exposure latch, and means mounted on said camera body for holding said actuating member temporarily at an intermediate position of its movement in said second position to maintain said control member temporarily in a position preceding release of said bulb exposure latch.

6. A construction as defined in claim 5, in which said means for holding said actuating member temporarily at an intermediate position includes a shoulder portion operatively connected to and moving with said actuating member, a resilient stop normally lying out of the path of travel of said shoulder portion, and a manually operable member for shifting said stop temporarily into the path of travel of said shoulder portion.

7. The combination of a photographic camera body having thereon a manually operable member rotatable in one direction, pawl and ratchet mechanism preventing rotation of said member in the opposite direction, a photographic shutter including a casing mounted on said body, shutter blades mounted in said casing, a spring powered master member mounted in said casing for spring tensioning movement between run-down position and tensioned position and effective during its returning spring powered movement from tensioned position to run-down position to open and close the shutter blades, means for latching said master member in tensioned position, a single actuating shaft extending from a position within said shutter casing to a position outside of said casing and within said camera body, means within said shutter casing and effective upon rotation of said shaft in a first direction for moving said master member to tensioned position and rendering said latching means effective to hold said master member in tensioned position and effective upon rotation of said shaft in a second direction for releasing said latching means so that said master member may move toward run-down position, spring means in said shutter casing tending to rotate said shaft in said second direction, disengageable driving means mounted on said camera body for rotating said shaft in said first direction from rotation of said manually operable member, said pawl and ratchet mechanism serving to prevent rotation of said shaft in said second direction as long as said disengageable driving means remains engaged, and means on said camera body for disengaging said driving means so that rotation of said shaft in said second direction will no longer be obstructed by said pawl and ratchet mechanism.

8. The combination of a photographic camera body having thereon a manually operable member rotatable in one direction, pawl and ratchet mechanism preventing rotation of said member in the opposite direction, a photographic shutter including a casing mounted on said body, shutter blades mounted in said casing, a master member mounted in said casing for movement between rundown position and tensioned position and effective during movement from tensioned position to run-down position to open and close the shutter blades, means for latching said master member in tensioned position, a single actuating shaft extending from a position within said shutter casing to a position outside of said casing and within said camera body, means within said shutter casing and effective upon rotation of said shaft in a first direction for moving said master member to tensioned position and rendering said latching means effective to hold said master member in tensioned position and effective upon rotation of said shaft in a second direction for releasing said latching means so that said master member may move toward run-down position, spring means in said shutter casing tending to rotate said shaft in said second direction, disengageable driving means mounted on said camera body for rotating said shaft in said first direction from rotation of said manually operable member, said pawl and ratchet mechanism serving to prevent rotation of said shaft in said second direction as long as said disengageable driving means remains engaged, a bulb exposure latch movable in said shutter casing between effective and ineffective positions and serving, when in effective position, to hold said shutter blades in open position, a manually operable trigger member mounted on said camera body for movement from a first position to a second position and resiliently tending to return to its first position when displaced therefrom, means operated by movement of said trigger member from first to second position for disengaging said driving means so that rotation of said shaft in said second direction will no longer be obstructed by said pawl and ratchet mechanism, and means effective upon return of said trigger member from second to first position for releasing said bulb exposure latch to enable completion of a bulb exposure.

9. The combination with a photographic camera body, of a photographic shutter constituting a separate unit mounted on said camera body, said shutter including movable blades and a spring powered master member movable from a run down position to a tensioned position and operatively connected to said blades to open and close them by movement back to run down position upon release from its tensioned position, a single actuating member interconnecting said shutter and said camera body and effective upon predetermined movements both to tension the shutter ready for exposure and to release the shutter to make an exposure, and means on the camera side of the division between said body and shutter for moving said actuating member through both its tensioning movement and release movement and for locking said actuating member temporarily against release movement.

10. The combination with a photographic camera body, of a photographic shutter constituting a separate unit mounted on said camera body, said shutter including movable blades and a spring powered master member movable from a run down position to a tensioned position and operatively connected to said blades to open and close them by movement back to run down position upon release from its tensioned position, a single actuating member interconnecting said shutter and said camera body and effective upon predetermined movements both to tension the shutter ready for exposure and to release the shutter to make an exposure, spring means on the shutter side of the division between said body and shutter tending to move said actuating member in a release direction, and means on the camera side for controlling movement of said actuating member.

11. The combination with a photographic camera body, of a photographic shutter constituting a separate unit mounted on said camera body, said shutter including shutter blades and shutter operating parts movable in one direction to tension the shutter ready for exposure and movable in a second direction to open the blades and then to close them to make an exposure, a first latch in said shutter for holding said parts in tensioned position, a second latch in said shutter for holding said blades in open position during the making of a bulb exposure, a single actuating member interconnecting said shutter and said camera body and effective upon movement in a first direction to tension said shutter operating parts and effective upon partial movement in a second direction to release said first latch and effective upon completion of movement in said second direction to release said second latch, means tending to move said actuating member in said second direction, releasable means on the camera side of the division between said body and said shutter for holding said actuating member against sufficient movement in said second direction to release said first latch, and other releasable means also on the camera side for holding said actuating member after partial movement but before completion of movement in said second direction.

12. The combination of a photographic shutter including blades pivoted for movement between open and closed positions, shutter operating parts movable in one direction to tension the shutter ready for exposure and movable in a second direction to open the blades and then to close them to make an exposure, a first latch for holding said operating parts in tensioned position, a second latch for holding said blades in open position during the making of a bulb exposure, actuating means effective upon movement in a first direction to tension said shutter operating parts, effective upon partial movement in a second direction to release said first latch, and effective upon completion of movement in said second direction to release said second latch, and a photographic camera body on which said shutter is mounted, said actuating means being mounted partly on said camera body.

13. The combination with a camera body, of an objective shutter of the settable type mounted on said body, said shutter having an exposure opening defining an optical axis, blades movable between closed and open positions with respect to said exposure opening, a spring powered master member rotatable about an axis parallel to said optical axis and offset laterally from said exposure opening, said master member being rotatable in a spring tensioning direction from a run down position to a tensioned position and being effective to open and close said blades upon rotation in a reverse direction from tensioned position to run down position, a releasable latch for holding said master member in tensioned position, a control ring rotatable about said optical axis as a center of rotation, said control ring having gear teeth thereon and having a cam portion for engaging said latch to release it so that said master member may turn from tensioned position to run down position, a shaft rotatable coaxially with said master member and extending rearwardly from said shutter toward the camera body on which said shutter is mounted, a disk fixed to said shaft to turn therewith, said disk having gear teeth meshing with said gear teeth of said control ring and also having a portion engaging said master member to turn said master member from run down position to tensioned position upon rotation of said disk in one direction, spring means acting on said control ring and tending to turn said control ring in a direction to rotate said disk in a reverse direction opposite to said direction in which said disk serves to tension said master member, means on said camera body for turning said shaft and said disk in a direction to tension said master member, and releasable means also on said camera body for holding said shaft against rotation in a reverse direction upon completion of rotation in a master member tensioning direction, so that upon release of said last mentioned means said spring means may rotate said control ring and said disk in said reverse direction to engage said cam portion of said control ring with said latch to release said latch so that said master member may rotate in its reverse direction to open and close said blades.

References Cited in the file of this patent

UNITED STATES PATENTS

| | | |
|---|---|---|
| 2,057,198 | Marcussen | Oct. 13, 1936 |
| 2,104,094 | Nerwin | Jan. 4, 1938 |
| 2,226,161 | Drotning | Dec. 24, 1940 |
| 2,301,956 | Kuppenbender et al. | Nov. 17, 1942 |
| 2,316,020 | Riddell | Apr. 6, 1943 |
| 2,362,546 | Fuerst | Nov. 14, 1944 |
| 2,410,649 | Fuerst | Nov. 5, 1946 |
| 2,448,876 | Fuerst | Sept. 7, 1948 |

FOREIGN PATENTS

| | | |
|---|---|---|
| 473,097 | Italy | July 11, 1952 |